(12) United States Patent
Das et al.

(10) Patent No.: US 10,700,992 B1
(45) Date of Patent: Jun. 30, 2020

(54) SYSTEM AND METHOD FOR MANAGING RESOURCES IN CLOUD ENVIRONMENT

(71) Applicant: Wipro Limited, Bangalore (IN)

(72) Inventors: Rishav Das, Howrah (IN); Maulik Yagnik, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/364,208

(22) Filed: Mar. 26, 2019

(30) Foreign Application Priority Data

Feb. 12, 2019 (IN) .............................. 201941005523

(51) Int. Cl.
*H04L 12/911* (2013.01)
*G06N 3/08* (2006.01)
*H04L 29/08* (2006.01)
*H04L 12/24* (2006.01)
*G06F 16/18* (2019.01)

(52) U.S. Cl.
CPC .......... *H04L 47/70* (2013.01); *G06F 16/1805* (2019.01); *G06N 3/08* (2013.01); *H04L 41/16* (2013.01); *H04L 67/10* (2013.01)

(58) Field of Classification Search
CPC ......... H04L 47/70; H04L 41/16; H04L 67/10; G06F 16/1805; G06N 3/08
See application file for complete search history.

(56) References Cited

U.S. PATENT DOCUMENTS

| 6,108,648 A * | 8/2000 | Lakshmi ........... G06F 16/24545 |
| 2010/0153482 A1 | 6/2010 | Kim et al. | |
| 2015/0082197 A1 | 3/2015 | Pearl et al. | |
| 2016/0078361 A1 * | 3/2016 | Brueckner .............. H04L 67/10 706/12 |
| 2019/0213099 A1 * | 7/2019 | Schmidt ................. G06F 9/5083 |
| 2019/0243691 A1 * | 8/2019 | LaBute .................. H04L 41/145 |
| 2019/0266325 A1 * | 8/2019 | Scherman ............. G06F 21/554 |
| 2019/0312800 A1 * | 10/2019 | Schibler .............. H04L 41/0823 |
| 2019/0312946 A1 * | 10/2019 | Chefalas ................. H04L 63/00 |
| 2020/0042434 A1 * | 2/2020 | Albertson ........... G06F 11/3692 |

OTHER PUBLICATIONS

Osis, J., et al., "Model-Driven Domain Analysis and Software Development: Architectures and Functions", Information Science Reference, IGI Global, 2011, 515 pages.

* cited by examiner

*Primary Examiner* — Jerry B Dennison
(74) *Attorney, Agent, or Firm* — Finnegan, Henderson, Farabow, Garrett & Dunner, LLP

(57) ABSTRACT

A method of managing resources in a cloud environment is disclosed. The method includes receiving a plurality of parameters associated with an event. The method further includes comparing a value of each of the plurality of parameters with a predefined threshold range. The method includes converting the value of each of the plurality of parameters into a vector, when the value of each of the plurality of parameters is within the predefined threshold range. The method further includes training a neural network based on the vector of the value of each of the plurality of parameters, wherein the neural network is trained to manage the event. The method includes storing an output of the trained neural network in a database in response to the training. The output corresponds to management of the event and the database further comprises a mapping of the event to the trained neural network.

15 Claims, 7 Drawing Sheets

| ID 402 | Name 404 | Type 406 | Origin 408 | Destination 410 | SPP 412 | Workflow 414 | ET 416 | Size 418 | RC 420 | NN 422 |
|---|---|---|---|---|---|---|---|---|---|---|
| #23A | IOPS-Read | IOB | DS | VM-ABC | #45C | Dataset | 0.4 ms | 42 b | 342 | RNN 1 |
| #67H | CPU-C | CPUB | PRS | VM-OP | Null | Dataset | 0.04 ms | 02 b | 1076 | RNN 45 |
| #03D | NET | IOB | NT | VM-CSS | #95C | Dataset | 0.54 ms | 23 kb | 78 | RNN 17 |
| #45C | IOPS-Read | IOB | DS | VM-ABC | Null | Dataset | 0.4 ms | 42 b | 342 | RNN 1 |

SYSTEM AND METHOD FOR MANAGING RESOURCES IN CLOUD ENVIRONMENT

TECHNICAL FIELD

This disclosure relates generally to cloud environment, and more particularly to a method and system for managing resources in cloud environment.

BACKGROUND

Cloud computing has been widely accepted in the industry as a revolution in Information Technology (IT). Cloud computing utilizes a cloud environment that may change the overall infrastructure of an IT domain. Different types of cloud environments may include, but are not limited to distributed clouds, virtual clouds, big data clouds, multi clouds, or the like. In the IT industry and electronic business, the cloud environment enables infrastructure as a service, platform as a service, software as a service, backend as a service, function as a service, or the like.

However, as the load increases in a cloud environment, the execution of commands, mapping of frameworks in the cloud, resolution of the errors, storage management, application and network handling becomes more critical and depends fully on human intervention. Additionally, the time latency, accuracy is also dependent on different competency levels of humans involved in the process. Another major problem is monitoring the incoming packets across different network connection to the cloud environment. Hence, continuous monitoring of network security and management according to incoming risk is required. However, continuous monitoring involves more resources with system and human involvement.

Some conventional methods for managing resources in the cloud environment automatically recover process or data using pre-defined set of knowledge or rules. However, these conventional methods are not efficient and generate a lot of errors. Additionally, these conventional methods need human involvement and do not have any intelligence for understanding a task.

SUMMARY

In one embodiment, a method of managing resources in a cloud environment is disclosed. The method may include receiving, by a resource managing device, from at least one layer in the cloud environment, a plurality of parameters associated with an event. The method may further include predicting, by the resource managing device, a value of each of the plurality of parameters based on a plurality of information associated with the plurality of parameters. The method may further include comparing, by the resource managing device, a value of each of the plurality of parameters with a predefined threshold range. The method may further include converting, by the resource managing device, the value of each of the plurality of parameters into a vector, when the value of each of the plurality of parameters is within the predefined threshold range. The method may further include training, by the resource managing device, a neural network based on the vector of the value of each of the plurality of parameters, wherein the neural network is trained to manage the event. The method may further include storing, by the resource managing device, an output of the trained neural network in a database in response to the training, wherein the output corresponds to management of the event, and wherein the database further includes a mapping of the event to the trained neural network.

In another embodiment, a resource managing device in the cloud environment is disclosed. The resource managing device includes a processor and a memory communicatively coupled to the processor, wherein the memory stores processor instructions, which, on execution, causes the processor to receive from at least one layer in the cloud environment, the plurality of parameters associated with the event. The processor instructions further cause the processor to predict the value of each of the plurality of parameters based on the plurality of information associated with the plurality of parameters. The processor instructions further cause the processor to compare the value of each of the plurality of parameters with the predefined threshold range. The processor instructions further cause the processor to convert the value of each of the plurality of parameters into the vector, when the value of each of the plurality of parameters is within the predefined threshold range. The processor instruction further cause the processor to train the neural network based on the vector of the value of each of the plurality of parameters, wherein the neural network is trained to manage the event. The processor instruction further cause the processor to store the output of the trained neural network in the database in response to the training, wherein the output corresponds to management of the event, and wherein the database further includes the mapping of the event to the trained neural network.

In yet another embodiment, a non-transitory computer-readable storage medium is disclosed. The non-transitory computer-readable storage medium has instructions stored thereon, a set of computer-executable instructions causing a computer comprising one or more processors to perform steps of receiving from at least one layer in the cloud environment, the plurality of parameters associated with the event; predicting, the value of each of the plurality of parameters based on the plurality of information associated with the plurality of parameters; comparing, the value of each of the plurality of parameters with the predefined threshold range; converting, the value of each of the plurality of parameters into the vector, when the value of each of the plurality of parameters is within the predefined threshold range; training, the neural network based on the vector of the value of each of the plurality of parameters, wherein the neural network is trained to manage the event; and storing, the output of the trained neural network in the database in response to the training, wherein the output corresponds to management of the event, and wherein the database further includes the mapping of the event to the trained neural network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
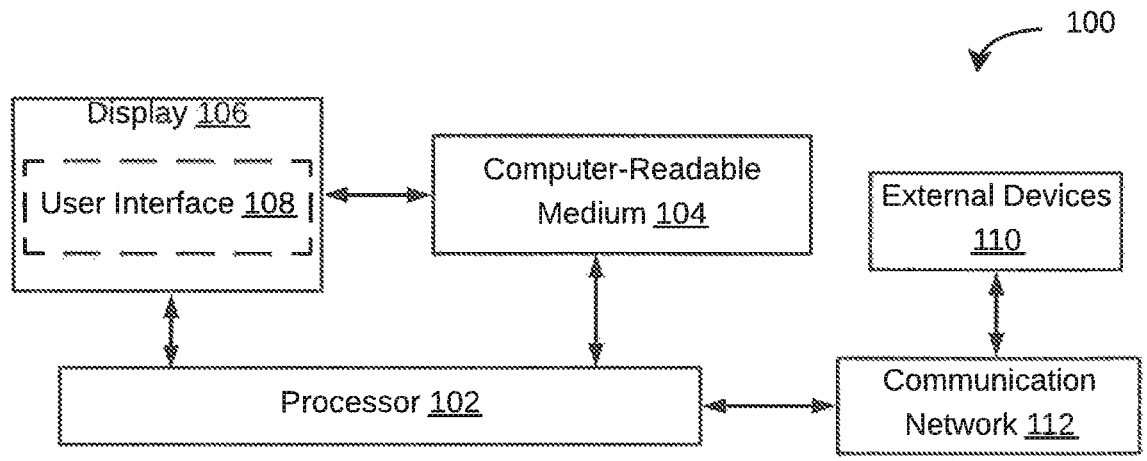
FIG. 1 is a block diagram illustrating an exemplary system for managing resources in a cloud environment, in accordance with an embodiment.

Referring now to FIG. 1, an exemplary system 100 for managing resources in a cloud environment is illustrated, in accordance with an embodiment. As will be appreciated, the system 100 may be implemented in the cloud environment for a specific application. Examples of the application may include but are not limited to Identification (ID) proof, technical back up, assigning some storage spaces, cleaning the database, cleaning and maintaining the docker, administration, performance tuning, network administration, backup administration, orchestration, Application Programming Interface (API) management, or the like. Further, the system 100 may be implemented in a resource managing engine (not shown in FIG. 1). In particular, the system 100 may include a resource managing device (for example, a server, a desktop, a laptop, a notebook, a netbook, a tablet, a smartphone, a mobile phone, or any other computing device) that may be implemented in the resource managing engine.

The system 100 may include a processor 102, a computer-readable medium 104 (for example, a memory), and a display 106. The computer-readable storage medium 104 may store instructions that, when executed by the processor 102, may cause the processor 102 to manage resources within the cloud environment. The computer-readable storage medium 104 may also store various data (for example, predefined threshold range, attributes associated with an event, and the like) that may be captured, processed, and/or required by the system 100. The system 100 may interact with a user via a user interface 108 accessible via the display 106. The system 100 may also interact with one or more of external devices 110 over a communication network 112 for sending or receiving various data. The external devices 110 may include, but may not be limited to a remote server, a digital device, or another computing system. The system 100 may also be adapted to exchange data with other components or service providers using the communication network 112, for example, the wide area network or the Internet.

Figure 2:
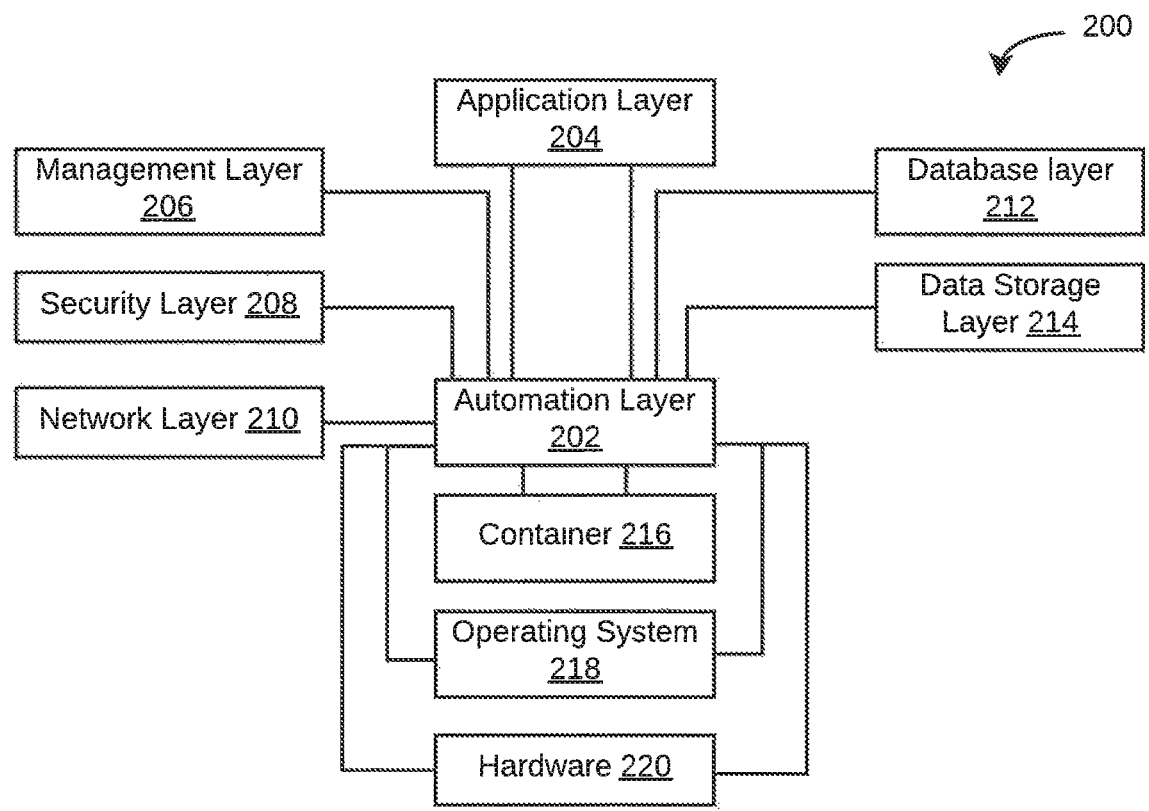
FIG. 2 illustrates a block diagram of a cloud environment that includes an automation layer amongst various layers for managing resources, in accordance with an embodiment.

Referring now to FIG. 2, a block diagram of a cloud environment 200 that includes an automation layer 202 amongst various layers for managing resources is illustrated, in accordance with an embodiment. The automation layer 202 may be communicatively coupled to one or more of an application layer 204, a management layer 206, a security layer 208, a network layer 210, a database layer 212, a data storage layer 214, or the like. Further, the automation layer 202 may be communicatively coupled to a container 216, an operating system 218, and a hardware 220.

As will be appreciated by those skilled in the art, all such aforementioned layers 204-214, may communicate with one or more of the container 216, the operating system 218, and the hardware 220 through the automation layer 202. Hence, all the aforementioned layers 204-214, the container 216, the operating system 218, and the hardware 220 may be integrated with the automation layer 202, and an internal transmission of data may be monitored, analyzed, learned, and deployed by the automation layer 202. It will be apparent to a person skilled in the art that functionalities of each of the aforementioned layers 204-214, the container 216, the operating system 218, and the hardware 220 is in accordance with the current state of the art.

Figure 3:
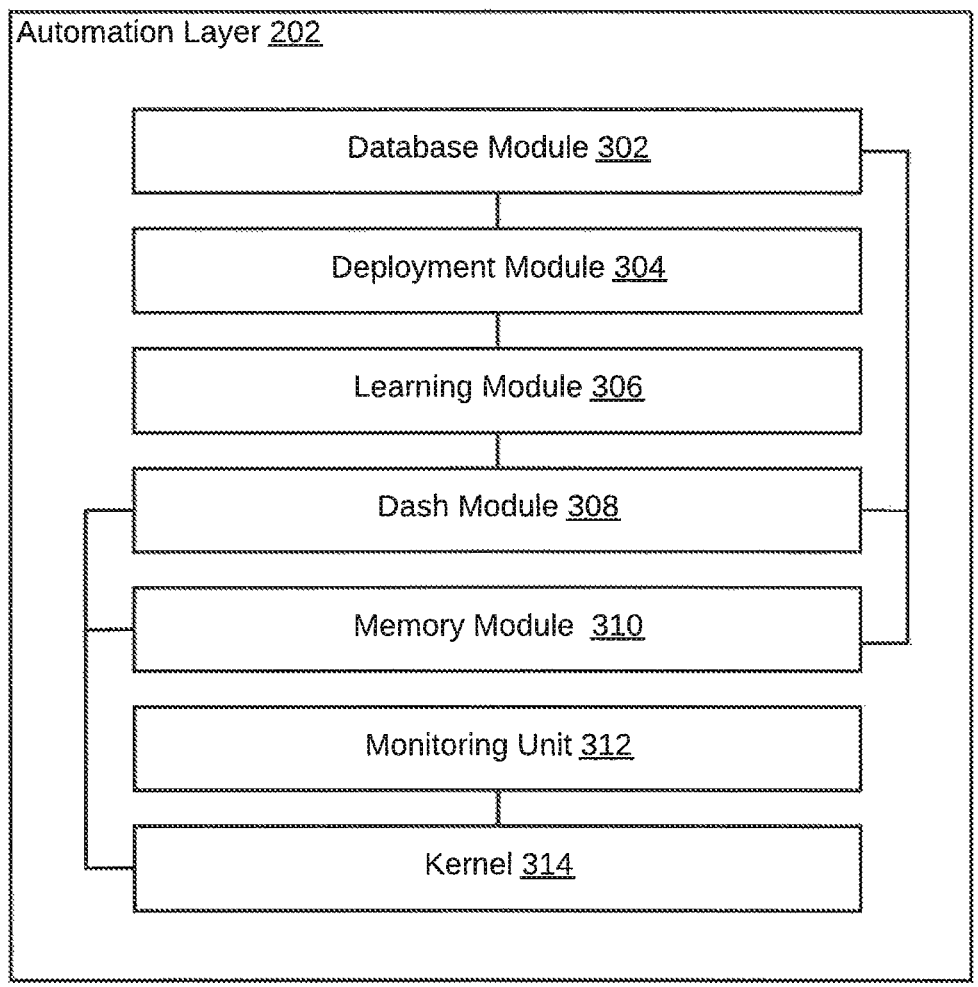
FIG. 3 is a block diagram illustrating an internal architecture of an automation layer within a cloud environment, in accordance with an exemplary embodiment.

Referring now to FIG. 3, a block diagram of an internal architecture of the automation layer 202 within the cloud environment 200 is illustrated, in accordance with an embodiment. The automation layer 202 may include a database module 302, a deployment module 304, a learning module 306, a dash module 308, a memory module 310, a monitoring unit 312, and a kernel 314. As will be appreciated by those skilled in the art, all such aforementioned modules 302-314 may be represented as a single module or a combination of different modules. Moreover, as will be appreciated by those skilled in the art, each of the modules 302-314 may reside, in whole or in parts, on one device or multiple devices in communication with each other.

In the automation layer 202, the monitoring unit 312 may be communicatively coupled to the kernel 314. The monitoring unit 312 may be used to monitor each of a plurality of information associated with a plurality of parameters, which is either reported or exchanged with the kernel 314. The plurality of parameters may be further associated with an event. Examples of the event may include, but are not limited to execution of commands, mapping of frameworks in cloud, process, dataset retrieval, resolution of the errors, storage management, application and network handling, backup services, API services, or the like. The plurality of parameters may be related to at least one of the application services, network services, storage services, database services or the like. The plurality of parameters related to network services may include, but are not limited to rate, jitter rate, packet drop, bandwidth, or the like. Similarly, the plurality of parameters related to storage services may include, but are not limited to raid failure, capacity filled up, code bugs, or the like. By way of an example, when the event may be failing of battery backup, the plurality of information may include, but are not limited to battery charge, battery volt, battery loads or the like.

The management layer 206 may include a log database which may include a plurality of logs associated with an event. Examples of the logs may include, but are not limited to capacity planning, log use, vendor management, solution testing and validation, system data flow, audit system logs, authentication and security, error code, resolution of the error code, or the like. Each of the plurality of logs may be integrated together in the management layer 206 of the cloud environment 200 and a process performed by the management layer 206 may be stored in the database layer 212. The monitoring unit 312 may be used to understand at least one of a process origin, each of a type of process, and a dataset which may need to be carried out and stored in the database layer 212 automatically. Further, the monitoring unit 312 may keep monitoring an amount of time the process requires to be carried out and based on the amount of time, the dash module 308 may further take decisions.

The automation layer 202 may include the memory module 310 that is communicatively coupled to the dash module 308, the database module 302, and the kernel 314. The memory module 310, for example, may include but is not limited to Random Access Memory (RAM), memory drives, or removable disc drives. Various modules in the automation layer 202 may access information stored in the memory module 310. The memory module 310 may be a virtual memory where each process operates while performing any type of operation. The memory module 310 may also be used to store a temporary process operation, an analyzing operation, a neural network operation in a database while generating logical Identification (ID) or the like.

The dash module 308 may be an intelligent module of the automation layer 202 which may automate the event. The dash module 308 may receive the plurality of parameters of the event from the database layer 212. Further, the dash module 308 may analyze the plurality of parameters and may provide the workflow of the event to the learning module 306. It should be noted that the dash module 308 may initiate and control each of the remaining modules 302-306 and 310-314. By way of an example, the dash module 308 may take decisions that may include, but are not limited to when does a process needs to be started, ended, or cleared in the automation layer 202.

The automation layer 202 may further include the learning module 306 that is communicatively coupled to the dash module 308. The learning module 306 may be a neural network which may learn steps that need to be followed in a sequential manner to manage the event, for example, resolve an error or simplify the event. Moreover, the learning module 306 may predict a value of each of the plurality of parameters associated with the event based on the plurality of information associated with the plurality of parameter. By way of an example, when the event may be failing of battery backup, the plurality of information may include, but are not limited to battery charge, battery volt, battery loads or the like.

Further, the learning module 306 may convert the value of each of the plurality of parameter into a vector, such that, each vector acts as a neuron in the neural network. Hence, the learning module 306 may include input layers, such that the number of input layers may be proportional to the number of the plurality of parameters that needs to be predicted. The learning module 306 may further include a hidden layer, which may not have a fixed number of neurons. The number of neurons in the hidden layer may vary between the number of neurons in the input layers to the number of neurons in the output layers. The learning module 306 may receive weight of neurons associated with the event from previous layer in order to train the neural network.

By way of an example, for an event, each value of the plurality of parameters may be converted into a vector in the neural network. $s_t$ may be the hidden state of the neural network at a time step t. $s_t$ may be calculated based on the previous hidden state and the input at the current step using equation 1 given below, $$s_t = f(Ux_t + Ws_{t-1}) \quad (1)$$

where,

W is the recurrent connection at a previous hidden layer and a current hidden layer;

U is the vector connecting the inputs to the current hidden layer.

The function f may include a non-linear function such as tan h, ReLU, or the like. $S_{t-1}$ may be required to be calculated in the hidden layer and may typically be initialized to zero. For example, if we want to predict a next word in a sentence, it would be a vector of probabilities across our vocabulary. The output at the time step t may be represented using equation 2 given below:

$$o_t = \text{softmax}(Vs_t) \quad (2)$$

where, $o_t$ is the output of the neural network at the time step t;

V is an end set of the vector after computation of the hidden layer.

The deployment module 304 of the automation layer 202, that is communicatively coupled to the database module 302 and the learning module 306 may receive the output from the learning module 306. Further, the deployment module 304 may deploy the output to the cloud environment 200. The output may be stored in the database module 302 until the output may be executed successfully. When the output does not execute successfully, an administrator may receive the output and provide a resolution for an error code generated by the learning module 306.

The database module 302 of the automation layer 202 may store the value of the plurality of parameters for an event that needs to be automated, when the event occurs in the future. By way of an example, an Intelligent Platform Management Module (IPMM) may receive a plurality of sensor values and may store these values as parameter associated with the IPMM, such as, a time stamp, in the database module 302. Further, when the event occurs in the cloud environment 200 in future, the dash module 308 may retrieve the plurality of parameters associated with the IPMM automatically from the database module 302. The database module 302 may include a database 400 to store such information. The database 400 is further explained in detail in conjunction with FIG. 4. The automation layer 202 further includes the kernel 314, which may be an operating system for the automation layer 202. The kernel 314 takes the plurality of parameters from various layers in the cloud environment 200 and further stores the plurality of parameters in the memory module 310.

The modules within the automation layer 202 may be connected using wireless or wired communication protocols, which may include, but are not limited to Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, I2C, Serial Peripheral Interface (SPI), Microwire, 1-Wire, IEEE 1284, Intel Quick Path Interconnect, InfiniBand, or Peripheral Component Interconnect Express (PCIe) etc.

Figure 4:
FIG. 4 illustrates a detailed structure of a database of an automation layer, in accordance with an exemplary embodiment.

Referring now to FIG. 4, the database 400 maintained by the database module 302 is illustrated, in accordance with an exemplary embodiment. The database 400 may store information related to the plurality of parameters associated with an event in multiple fields. These multiple fields may include, but are not limited to an identification (ID) field 402, a name field 404, a type field 406, an origin field 408, a destination field 410, a Sub-Process Pointer (SPP) field 412, a workflow field 414, an Execution Time (ET) field 416, a size field 418, a Reference Count (RC) field 420 and a trained neural network field 422.

In the database 400, the ID field 402 may include an ID associated with an event and may act as a primary key of the database 400, the name field 404 includes name of the process, the type filed 406 includes details regarding a type of the process, the origin field 408 includes details regarding the originating node of the process, the destination field 410 includes details regarding the destination node of the process, the workflow field 414 may store a workflow of a process associated with the event, the SPP field 412 may store a sub-process of the process (the SPP may be null if the process does not include any sub-process), the ET field 416 may be the time required by a central processing unit (CPU) to execute the process, the RC field 420 may store a record of the number of executions of the process in the past, and the trained neural network field 422 may include details of a trained neural network that may be deployed to automate the process.

By way of an example, for a given event, in the database 400 the identification field 402 may store "#23A," the name field 404 may store "the input output per second (IOPS) read," the type field 406 of the event is Input Output Block (10B), the origin field 408 of the event is Data Store (DS), the destination field 410 of the event is virtual machine (VM)-ABC, the SPP field 412 of the event is #45C, the workflow field 414 of the event is dataset, the ET field 416 of the event is 0.4 ms, the size field 418 of the event is 42 bit (b), the RC field 420 of the event is 342, and the neural network field 422 of the event is the Recurrent Neural Network (RNN) 1.

Figure 5:
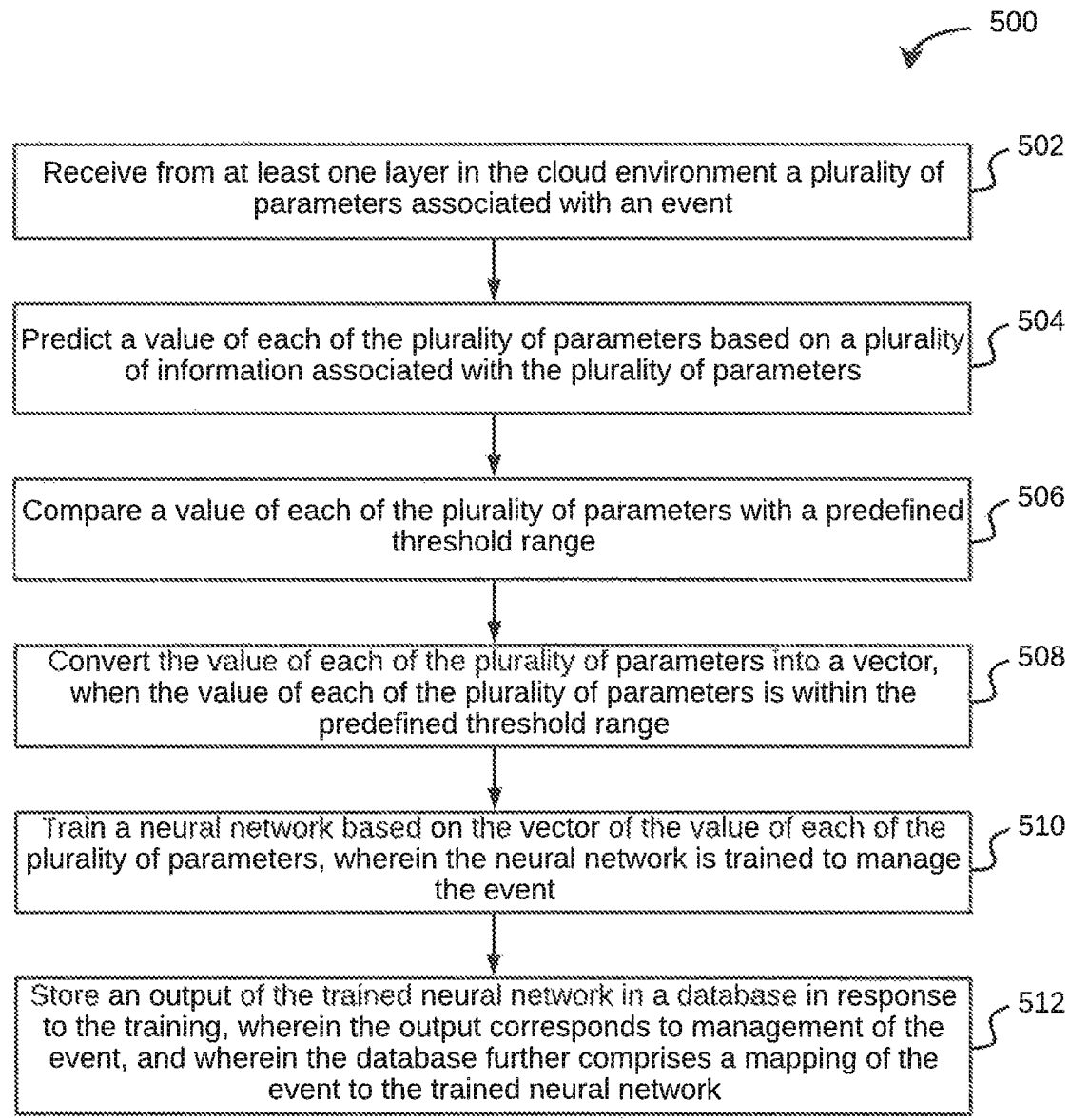
FIG. 5 illustrates a flowchart of a method for managing resources in a cloud environment, in accordance with an embodiment.

Referring now to FIG. 5, a flowchart of a method 500 for managing resources in the cloud environment 200 is illustrated, in accordance with an embodiment. The method 500 may be executed by the resource managing device, which for example, may include or implement the automation layer 202.

At step 502, the resource managing device may receive a plurality of parameters associated with an event from one or more layers in the cloud environment 200. The event may be a process or a set of sub processes which may occur in the cloud environment 200. The one or more layers may include the management layer 206, the security layer 208, the network layer 210, the database layer 212, the data storage layer 214, or the application layer 204. The plurality of parameters may be retrieved from a log database associated with each of the one or more layers. The log database associated with a given layer may include the plurality of logs associated with the event. The plurality of parameters may be related to one or more of the application services, network services, storage services, database services, or the like. The plurality of parameters related to network services may include, but are not limited to jitter rate, packet drop, bandwidth, or the like. Similarly, the plurality of parameters related to storage services may include, but are not limited to raid failure, capacity filled up, code bugs, or the like.

The resource managing device may monitor each event that has occurred in the cloud environment 200 and may select the events with higher values in the RC field 420 of the database 400, for example. Further, the resource managing device may store the plurality of information associated with the plurality of parameter of the event for further analysis. By way of an example, when the event may be an error message and a given parameter of the plurality of parameter may be 'X' then the plurality of information associated with the given parameters 'X' may include, but are not limited to a unique ID, token, or the like. Example of the error message may include, but are not limited to badAntiCsrf, badContentType, badParameter, or the like. It should be noted that the automation layer 202 in the cloud environment 200 may generate an error and the plurality of parameters associated with the error may be determined in at least one of the numeric values, string, binary representation, or the like. The plurality of parameters may not be similar for each of the event. Hence, the plurality of parameters associated with the event may be specified by the administrator.

The execution of a process associated with the event may include computational process such as an arithmetical operation, a logical operation, an IOPS operations and management, an exchange of variables, or the like. Each of the internal operations within the operating system may use the computational process for execution. The flow of the process along with the value of the parameters associated with the event may be stored.

At step 504, the resource managing device may predict a value of each of the plurality of parameters based on the plurality of information associated with the plurality of parameters. Further, the plurality of information associated with the values of the plurality of parameters may be used for training. By checking the errors, the neural network may be trained further to increase prediction accuracy. The errors may be monitored into a separate database or hash map tables.

Based on the predicted value of the plurality of parameters, the resource managing device may determine one or more attributes associated with the event and may accordingly update a predefined threshold range. The predefined threshold range may be defined based on a priority of the output generation for each of the plurality of parameters. The determination of the predefined threshold range is explained in detail in conjunction with FIG. 6.

Further, the resource managing device may compare the value of each of the plurality of parameters with the predefined threshold range at step 506. In an embodiment, if the value of one or more of the plurality of parameters is below the predefined threshold range, the plurality of parameters may be discarded and if the value of each of the plurality of parameters is above the predefined threshold range then the resource managing device may match the event with a list of events stored in the database, for example, the database 400. This is further explained in detail in conjunction with FIG. 6. It should be noted that the neural network may include, but is not limited to a Long Short Term Memory (LSTM) network, a Recurrent Neural Network (RNN), or a convolutional neural network (CNN).

When the value of each of the plurality of parameters associated with the event may be within the predefined threshold range, the resource managing device may convert the value of each of the plurality of parameters into a vector at step 508. A vector, which represents a value of a parameter, may be used as a neuron in the neural network in order to train the neural network. Hence, at least one neuron may be associated with each of the plurality of parameters. In an embodiment, when the neural network is the LSTM, the input may be passed through a plurality of gates, which may include a forget gate, a release gate, and a memory gate. The value for each of the plurality of parameters may be represented as a neuron in the LSTM. When the value of each of the plurality of parameters may be less than the predefined threshold range, the LSTM may remove the associated neurons through the forget gate. However, when the value of each of the plurality of parameters may be within the predefined threshold range, the LSTM may train the neurons associated with the plurality of parameters through the memory gate. In another scenario, when the value of each of the plurality of parameters may be above the predefined threshold range, then the LSTM may match the event with a list of events stored in the database (for example, the database 400) through the release gate.

Based on the vector of the value of each of the plurality of parameters, the resource managing device, may train the neural network to manage the event at step 510. In another embodiment, the neural network may train itself based on incremental learning using weights of the neurons associated with the event that may have occurred in past. If an event has many possibilities of handling the output, then such an event may be handled based on the output of the event that may have occurred in past. In CNN, the dataset may need to provide in form of a matrix and further the sliding mechanism may go through the matrix. Similarly, other mechanisms may also be applied such as maxpooling.

By way of an example, the value of each of the plurality of parameters associated with the event may be stored in the resource managing device at time instance t. Further, if the event occurs again the value which may be stored in t−1 time instance may be used. So, the event in the neural network may receive the dataset of the previous instance t−1 and further, the neural network may predict the dataset of time t+1 instance. The process is known as back propagation, which may help to reduce errors in the neural network. The dataset may be processed in hidden layer, which may pass the output through an activation function that finally releases the output. The activation function may include, but is not limited to tan h, sigmoid, relu, or the like. The output may be associated with a new dataset that is to be predicted for the time instance t+1. This cycle may be iteratively continued to predict value of each of the plurality of parameter, when the event occurs in the future.

At step 512, the resource managing device may store the output of the trained neural network in the database in response to the training. The database, for example, may be the database 400 as illustrated in FIG. 4. The output may correspond to management of the event. In other words, the output of the trained neural network may lead to management of the event. The database further includes the mapping of the event to the trained neural network. The output of the event may need to be stored in the database for future use. The mapping of the event may be accomplished so that when the neural network fails to determine the output of the event based on the past instances, then mapping of the event may help the administrator to identify a relevant trained neural network to be deployed. Moreover, the mapping of the event may be used to train the neural network when the same event occurs in future. It should be noted that the training of the neural network based on the mapping of the event is done either by the operating system of the automation layer 202 or by the administrator. Moreover, the mapping of the event may help the neural network to learn mistakes made by the LSTM in order to avoid such mistakes in future executions.

Further, in another embodiment, the resource managing device may detect occurrence of the event in the cloud environment 200 and deploy the trained neural network to manage the event based on the mapping in the database.

Figure 6A:
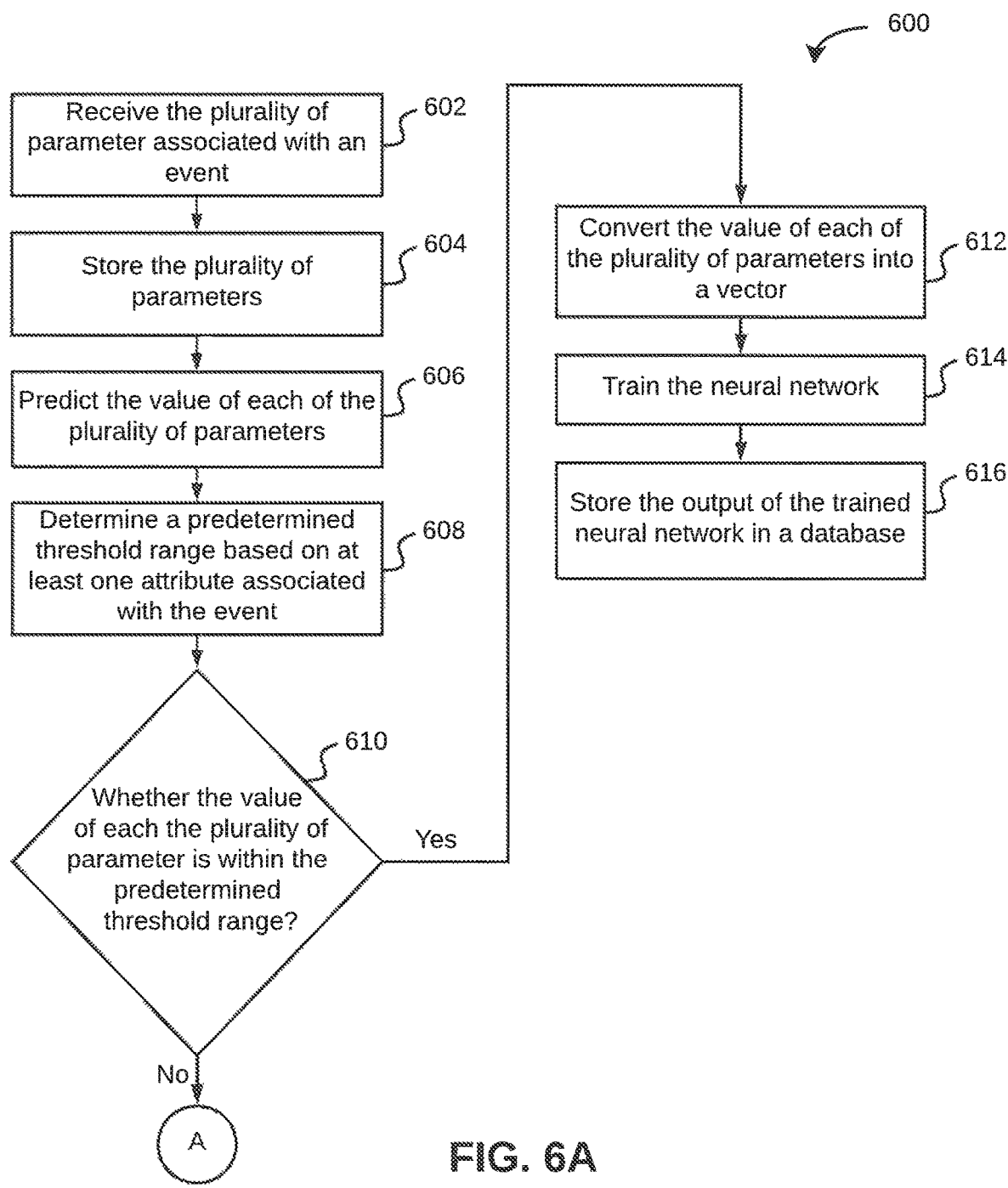
FIGS. 6A and 6B illustrate a flowchart of a method for handling an event by a neural network in a cloud environment, in accordance with an embodiment.
Figure 6B:
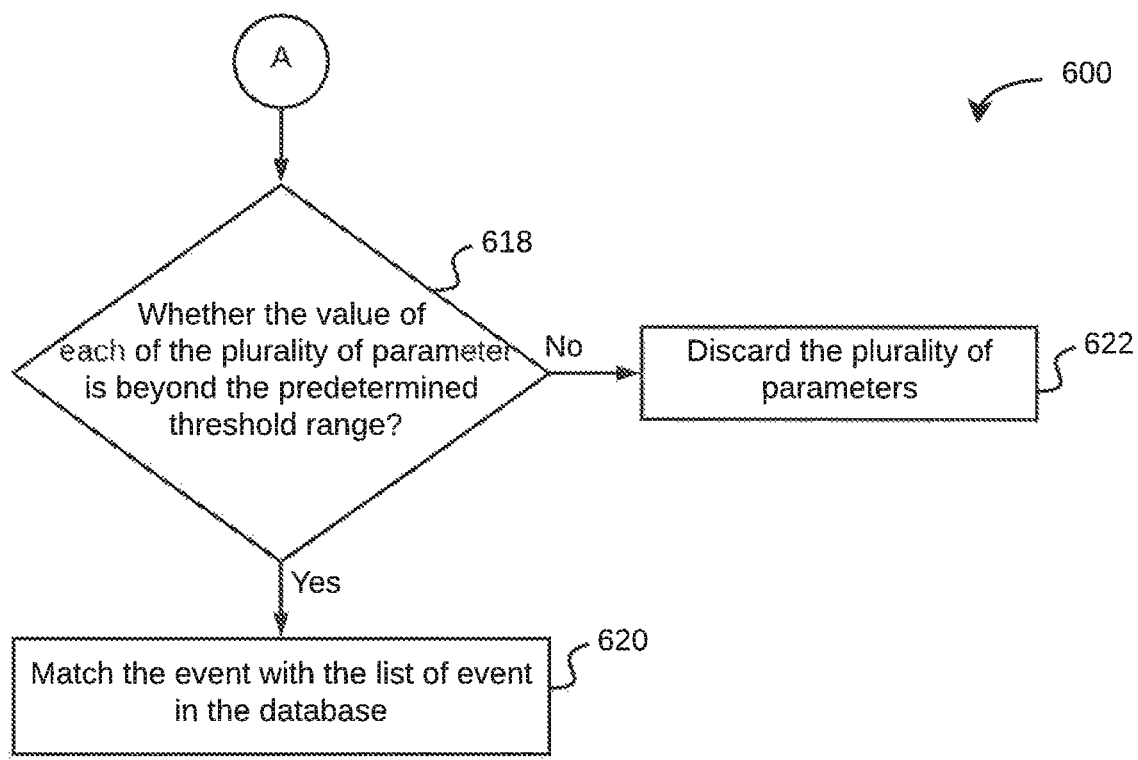

Referring now to FIGS. 6A and 6B, a flowchart of a method 600 for handling an event by a neural network in the cloud environment 200 is illustrated, in accordance with an embodiment. At step 602, the plurality of the parameters associated with an event may be received. At step 604, the plurality of parameters may be stored in order to predict the value of each of the plurality of parameters. The plurality of parameters may be stored into the memory module 310 of the automation layer 202. At step 606, the value of each of the plurality of parameters may be predicted based on a plurality of information associated with the plurality of parameters. This has been explained in detail in conjunction with FIG. 5.

At step 608, a predetermined threshold range may be determined for training the neural network, based on one or more attributes associated with the event. The predetermined threshold range may be scaled up or scaled down based on required accuracy of prediction, By way of an example, when the predetermined threshold range may be 50% to 80%, the accuracy of prediction of the neural network may be high. However, in this case, less number of events may get trained. By way of another example, when the predetermined threshold range may be 40% to 70%, the accuracy of prediction may be low, but more number of events may get trained.

Further at step 610, a check is performed to determine whether the value each of the plurality of parameters is within the predetermined threshold range. For example, when the predetermined threshold range may be 50% to 80%, the neural network may determine whether the value of each of the plurality of parameters is within 50% to 80%. When the value of each of the plurality of parameters is within the predetermined threshold range (for example, 50% to 80%) then the neural network may convert the value of each of the plurality of parameters into a vector through a release gate at step 612. The release gate may help in learning and prediction of the neural network. Each of the vector may be used as the neuron in the neural network for training. At step 614 the neural network may be trained in terms of language, image, script, or the like. At step 616, the trained neural network may be stored in the database (for example, the database 400). This has been explained in detail in conjunction with FIG. 5.

Referring back to step 610, when the value of each of the plurality of parameters does not fall within 50% to 80%, a further check is performed at step 618, to determine whether the value of each of the plurality of parameters is beyond the predetermined threshold range. When the value of each of the plurality of parameters is beyond the predetermined threshold range, the neural network, at step 620, may match the event with the list of events in the database (for example, the database 400) through a memory gate at step 620. By way of an example, when the predetermined threshold range may be 50% to 80% and the value of each of the plurality of parameter may be beyond the predefined threshold range (for example, 90%), the neural network may match the event with the list of event in the database through the memory gate. Referring back to step 618, when the value of each of the plurality of parameter may be less than the predefined threshold range, the neural network, at step 622, may discard the plurality of parameters through the forget gate.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
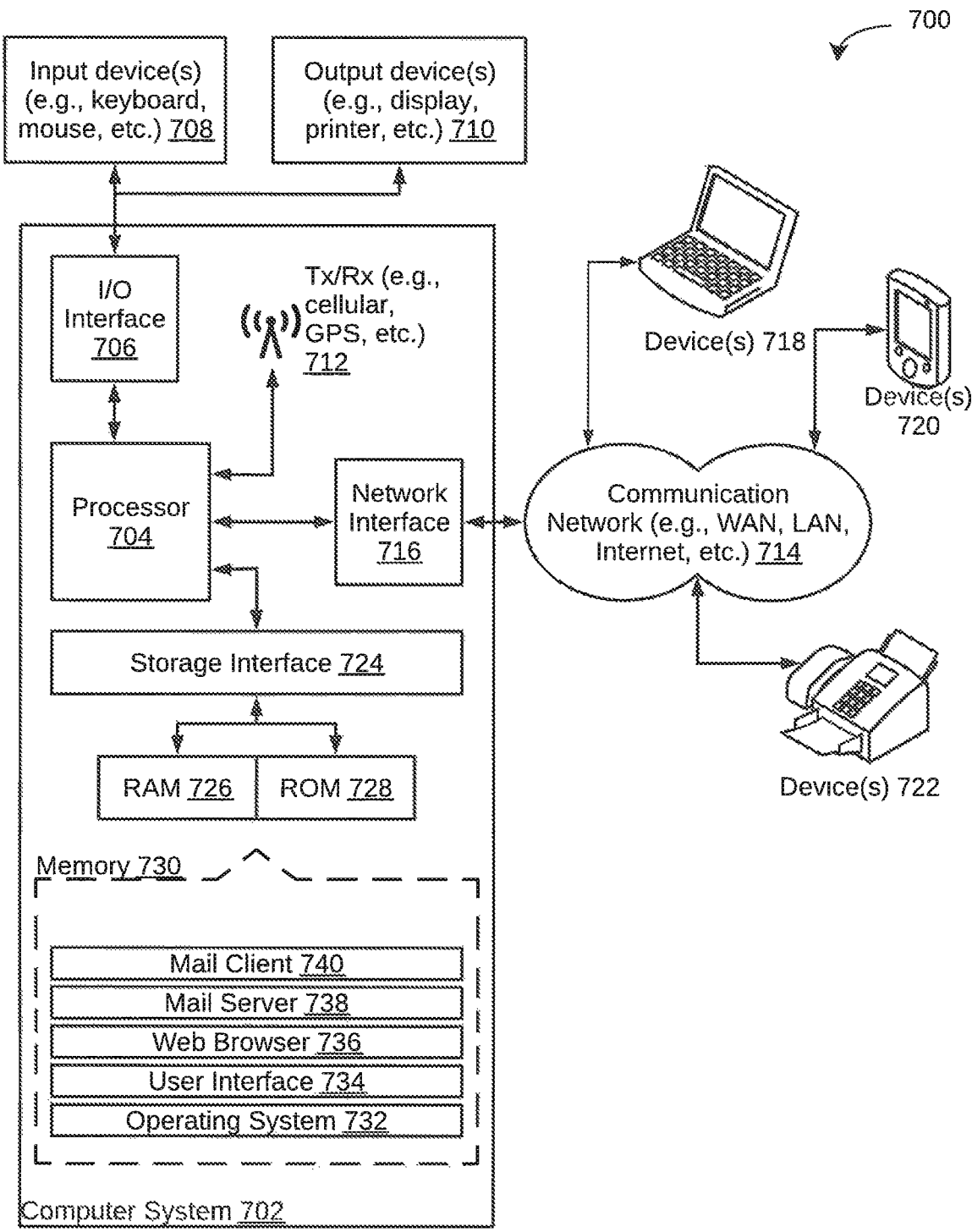
FIG. 7 is a block diagram of an exemplary computer system for implementing embodiments.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 714. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc.

Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client. MICROSOFT ENTOURAGE® mail client, MICROSOFT OUTLOOK® mail client, MOZILLA THUNDERBIRD mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provide method and system for managing resources in a cloud environment. In particular, the method uses deep learning technique to automatically provide output of the event that may have occurred in past. Further it helps to automate error code resolution, health checks, and maintenance. By automating the process, the proposed method meets the Service Level Agreement (SLA) and the Service Level Objective (SLO) of the customers. Moreover, the automation of the neural network may reduce duplication of data in the database.

The proposed method reduces the time required to handle the event by automating a process associated with the event. Further it helps to reduce the manual effort and the workload, which further reduces cost of delivery of a service. Additionally, the proposed method automates the process with solution of failures, such as, a backup service, an upgrade service, or the like.

The specification has described system and method of managing resources in a cloud environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description, Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing resources in a cloud environment, the method comprising:
   receiving from at least one layer in the cloud environment, by a resource managing device, a plurality of parameters associated with an event;

predicting, by the resource managing device, a value of each of the plurality of parameters based on a plurality of information associated with the plurality of parameters;

comparing, by the resource managing device, the value of each of the plurality of parameters with a predefined threshold range;

converting, by the resource managing device, the value of each of the plurality of parameters into a vector, when the value of each of the plurality of parameters is within the predefined threshold range;

training, by the resource managing device, a neural network based on the vector of the value of each of the plurality of parameters, wherein the neural network is trained to manage the event; and storing, by the resource managing device, an output of the trained neural network in a database in response to the training, wherein the output corresponds to management of the event, and wherein the database further comprises a mapping of the event to the trained neural network.

2. The method of claim 1, wherein the at least one layer comprises at least one of a management layer, a security layer, a network layer, a database layer, a data storage layer, or an application layer.

3. The method of claim 2, wherein the plurality of parameters are retrieved from a log database associated with each of the at least one layer, and wherein the log database comprises a plurality of logs associated with the event.

4. The method of claim 1, further comprising:
determining at least one attribute associated with the event; and
updating the predefined threshold range based on the at least one attribute.

5. The method of claim 1, further comprising discarding the plurality of parameters, when the value of at least one of the plurality of parameters is below the predefined threshold range.

6. The method of claim 1, further comprising matching the event with a list of events in the database, when the value of each of the plurality of parameters is above the predefined threshold range, wherein the database comprises mapping of each of the list of events with an associated trained neural network.

7. The method of claim 1, further comprising:
detecting occurrence of the event in the cloud environment; and
deploying the trained neural network to manage the event, based on the mapping in the database.

8. A resource managing device in a cloud environment, the resource managing device comprising:
a processor; and
a memory communicatively coupled to the processor, wherein the memory stores processor instructions, which, on execution, causes the processor to:
receive from at least one layer in the cloud environment, a plurality of parameters associated with an event;
predict a value of each of the plurality of parameters based on a plurality of information associated with the plurality of parameters;
compare the value of each of the plurality of parameters with a predefined threshold range;
convert the value of each of the plurality of parameters into a vector, when the value of each of the plurality of parameters is within the predefined threshold range;
train a neural network based on the vector of the value of each of the plurality of parameters, wherein the neural network is trained to manage the event; and
store an output of the trained neural network in a database in response to the training, wherein the output corresponds to management of the event, and wherein the database further comprises a mapping of the event to the trained neural network.

9. The resource managing device of claim 8, wherein the at least one layer comprises at least one of a management layer, a security layer, a database layer, a data storage layer, a network layer, or an application layer.

10. The resource managing device of claim 9, wherein the plurality of parameters are retrieved from a log database associated with each of the at least one layer, and wherein the log database comprises a plurality of logs associated with the event.

11. The resource managing device of claim 8, wherein the processor instructions further cause the processor to:
determine at least one attribute associated with the event; and
update the predefined threshold range based on the at least one attribute.

12. The resource managing device of claim 8, wherein the processor instructions further cause the processor to discard the plurality of parameters, when the value of at least one of the plurality of parameters is below the predefined threshold range.

13. The resource managing device of claim 8, wherein the processor instructions further cause the processor to match the event with a list of events in the database, when the value of each of the plurality of parameters is above the predefined threshold range, wherein the database comprises mapping of each of the list of events with an associated trained neural network.

14. The resource managing device of claim 8, wherein the processor instructions further cause the processor to:
detect occurrence of the event in the cloud environment; and
deploy the trained neural network to manage the event, based on the mapping in the database.

15. A non-transitory computer-readable storage medium having stored thereon, a set of computer-executable instructions causing a computer comprising one or more processors to perform steps comprising:
receiving from at least one layer in a cloud environment, a plurality of parameters associated with an event;
predicting a value of each of the plurality of parameters based on a plurality of information associated with the plurality of parameters;
comparing the value of each of the plurality of parameters with a predefined threshold range;
converting the value of each of the plurality of parameters into a vector, when the value of each of the plurality of parameters is within the predefined threshold range;
training a neural network based on the vector of the value of each of the plurality of parameters, wherein the neural network is trained to manage the event; and
storing an output of the trained neural network in a database in response to the training, wherein the output corresponds to management of the event, and wherein the database further comprises a mapping of the event to the trained neural network.

* * * * *